United States Patent [19]

Desjardins

[11] Patent Number: 4,672,374
[45] Date of Patent: Jun. 9, 1987

[54] SYSTEM FOR BILATERAL COMMUNICATION OF A COMMAND STATION WITH REMOTELY LOCATED SENSORS AND ACTUATORS

[75] Inventor: Paul A. Desjardins, Commack, N.Y.

[73] Assignee: Firecom, Inc., Woodside, N.Y.

[21] Appl. No.: 746,903

[22] Filed: Jun. 20, 1985

[51] Int. Cl.$^4$ .............................................. H04Q 1/00
[52] U.S. Cl. .............................. 340/825.07; 340/825.1; 340/825.54
[58] Field of Search ...................... 340/825.06, 825.07, 340/825.1, 825.16, 825.14, 825.54, 525, 518, 505; 179/5 R; 370/29, 53, 100

[56] References Cited

U.S. PATENT DOCUMENTS

| | | | |
|---|---|---|---|
| 3,559,177 | 1/1971 | Benson | 340/825.07 |
| 3,921,168 | 11/1975 | Dunbar | 340/408 |
| 3,963,869 | 6/1976 | Caldwell | 370/100 |
| 4,067,008 | 1/1978 | Sprowls, III | 340/409 |
| 4,342,985 | 8/1982 | Desjardins | 340/525 |

Primary Examiner—Ulysses Weldon
Attorney, Agent, or Firm—Nolte, Nolte and Hunter

[57] ABSTRACT

A remote sensing and control system wherein a plurality of remote sensing units are connected to a central control and monitoring console by only four interconnecting wires. A clock signal is converted to a plurality of parallel address signals at the local monitoring console and also at the remote sensing units located up the building. A sync signal is employed to synchronize all of the serial-to-parallel converters in the system, and each remote unit is provided with a specific code and is identified by selectively routing one or more signals through an inverter located at each unit so that the signals trigger a logic device in the particular time slot assigned to each remote unit. The input circuitry of each remote sensing unit compares two reference signals derived from the least significant bit of the address signals with the return signal from the sensing device to sense for opens, grounds, normal conditions, and alarms. The system is adapted to operate with conventional computing means and programmable read only memories, as well as a multiplexer unit, for providing control signals to operate controlling devices upon the occurrence of predetermined signals from the sensing device. Monitoring of command functions to activation remote devices is also provided.

14 Claims, 8 Drawing Figures

SYSTEM FOR BILATERAL COMMUNICATION OF A COMMAND STATION WITH REMOTELY LOCATED SENSORS AND ACTUATORS

BACKGROUND OF THE INVENTION

The present invention relates generally to remote sensing and control systems and, specifically, to a detection and alarm system employing a plurality of remote sensing units which are directly connected to a central monitoring and control center or command station.

There is presently a growing requirement for providing large buildings with systems which can detect emergency conditions. For example, in large apartment or office buildings, smoke detectors and the like may be located throughout the building with each detector then being connected to a central monitoring console, which is to be manned at all times. While the very first systems of this kind required each individual sensing unit to be directly connected by dedicated wires to the central control and monitoring console, various methods of reducing the number of wires needed to interconnect the units with the central console are now known.

It is important to reduce the number of interconnecting wires not only to reduce material costs, but also to reduce the amount of labor and time involved in installing the first detection system into the building.

One approach towards reducing the large number of wires needed to connect a multiplicity of sensors is disclosed in U.S. Pat. No. 3,921,168, assigned to the assignee hereof. In that patent, a system is shown which can permit a plurality of remote units to be connected in parallel to the monitoring and control center by a plurality of signal carrying wires, a monitoring wire, and a control wire. The number of remote units monitored and controlled may be as many $2^n$, where n is the number of signal carrying wires comprising the above-mentioned plurality. While this system afforded a major reduction in the number of interconnection wires necessary in large installations employing many remote sensing units, it may be seen that a relatively large number of signal carrying wires would still be required if, say, five hundred sensors are involved.

Another approach to reducing the number of wires required to connect a plurality of fire detection transponders to a central station is set forth in U.S. Pat. No. 4,067,008, wherein DC pulses are used to interrogate the plurality of sensors, each sensor and its associated transponder employs a counter which counts the interrogation pulses and will respond only after the particular interrogation pulses corresponding to the count assigned to that transponder have been received.

A further approach to decreasing the number of interconnection wires involves transmitting a specific word over a data bus to the sensing units, in order to determine the status of each of the sensing units. Although this approach appears promising, a relatively large data bus is required by the system. Alternatively, time division multiplex (TDM) systems can be used for interrogating, in the manner generally known to the communications industry, a number of transponders connected to a central monitoring station.

While all of these systems are effective in reducing the number of interconnections required, they attendantly involve complex electronic units to code and decode the digital words and/or to provide time division multiplexing.

Another disadvantage in prior systems has been the inability of the systems to cope with a grounded monitoring line. A grounded monitoring line can result from an integrated circuit failure, a shorted output transistor in a transponder, or a short to the building ground. A grounded monitoring line has caused all devices to go into alarm and to call the Fire Department. This is an undesirable false alarm condition.

An improved sensing system is disclosed in the U.S. Pat. No. 4,342,985, which issued in the name of P. A. Desjardins on Aug. 3, 1982, and is assigned to the assignee hereof, the system being capable of monitoring up to five hundred and twelve sensing units with only one wire being used for the monitoring function, and three other wires being used, respectively, for synchronization, clock and control. However, in spite of the improved operation obtainable with the foregoing system, it is desirable to transmit still further information via the monitoring wire and to reduce the number of wires required for the timing and control functions.

SUMMARY OF THE INVENTION

The present invention provides a system wherein a plurality of remote sensing units, up to five hundred and twelve, are connected to a central control and monitoring console by only three interconnecting wires. Specifically, the remote units are connected in parallel to the monitoring and control center by a data receiving or monitoring wire, a control signal wire, and a sync wire. Use of only three wires is made possible in the present invention by providing a system wherein a serial clock signal is converted to a plurality of coded address signals of progressively doubled wave lengths or, conversely, the frequency is successively halved. All of these coded address signals are sent to a display unit. The same form of clock signal is also generated at remote sites, for example, at various ones of the floors of a tall office building wired with the sensing units. Other converters are located at the remote sites for converting the serial clock signals into the identical set of coded address signals which were generated by the first converter. A sync signal is employed to synchronize all of the clocks and converters in the inventive system. A remote unit may comprise a sensor of temperature, smoke or other physical phenomenon and/or an actuator such as a door closer, a fan or some other actuator such as a device for sounding an alarm. Each remote unit is provided with a specific address code, a set of codes being produced sequentially, so that the signals trigger respective ones of the devices in the specific time slots assigned to each remote unit. According to the open, closed, or grounded status of a particular remote sensing unit, a logic device sends a signal through the data receiving or monitoring wire for each unit in its specific time slot. The central control and monitoring console then sequentially monitors each remote unit in its individual time slot and indicates the status of all remote units to the operator. Each remote unit, in addition to its sensing function can include a relay which can be activated by a control signal from the control and monitoring console during the time slot for that unit. To achieve this, computing means may be programmed to activate the relays of one or more of the remote units at the appropriate time slots.

The apparatus according to the present invention generates serial clock pulses which are converted in a serial-to-parallel converter to a parallel address. This address is forwarded to a monitoring display, a control section, and a comparator section in the central console. The address is logically compared and when all of the addresses have been produced, a sync pulse is produced, which is used to reset all serial-to-parallel converters. The sync pulse is issued to the display and to the remote sensing circuitry, thereby causing all address lines to return to a zero state.

A strobe signal is produced which clocks the data to the display control and comparator sections. The sync clock is sent up the building to each remote location or to clusters of closely located remote units, where the signal is reshaped and fed to the local clock and serial-to-parallel converter or address counter. The addresses produced by the converter or address counter are fed to a multiplexer for selecting signals of individual transponders of the remote units.

The input circuitry of each remote sensing device compares two reference signals derived from the least significant bit (LSB) of the address from the serial-to-parallel converter, with the return signal from the sensing device and its associated current-control circuitry. A comparator unit senses for opens (trouble), grounds (trouble), normal, and alarms. A loss or reduction of return current from a sensor indicates trouble or ground, and an increase in return current indicates an alarm. The outputs of the comparator unit are fed to a corresponding exclusive OR gate. The comparator unit operates such that if the signal is the same as that sent out to the remote device, then there is no change in the output of the exclusive OR gate, a normal is indicated, and a normal signal is sent. If the return signal is steady high, then the outputs of the comparator unit will cause a trouble signal to be sent to the control center in the time frame assigned to that device. If the return signal has an increase in current, the comparator units feed this level shift to the exclusive OR gate. The result is an alarm signal being sent back to the central console.

Programmable read only memories (PROM) may also be used advantageously to send control signals on the control line to energize relays at the remote collection panels. It is also advantageous to use an eight-bit multiplexer provided with a number of manually actuable switches, which permit selection of at least one of the remote actuating units. When the multiplexer sees the selected address, a control signal is placed on the control line, so that only a controlled device whose time slot corresponds to the multiplexer output will be energized. Typically, the controlled device includes a relay which is actuated by the control signal.

Additionally, a computing means such as a microcomputer and a programmable read-only memory (PROM) can be used so that all control signals are derived from the computer's control logic. These control signals are used, for example, to operate relays to shut down fans and to recall elevators. The kind of alarm, e.g., Manual Station, Elevator Smoke Detectors, etc. will be displayed by the PROM and its associated circuitry, as well as on the floor where the alarm originated and on the floor directly above. The local Fire Department can also be notified by a signal produced by the computer. The system can be easily programmed so that, if the computer fails, an audible and visible signal is produced. It is also possible to use the computer's own diagnostics to cause it to display or print out the kind of failure it is experiencing.

At each remote site, OR circuitry is incorporated with the comparator units to permit introduction of a sample of a command signal used in the activation of a remote device. Thereby, the output signal of the comparator unit is altered from a normal state to show that the command signal has been properly generated. A multiplexer is employed for providing a sequence of output signals from the comparator units. Additionally, if desired, the multiplexer can be inhibited during a preselected time slot for blocking the signal transmission from a specific one of the comparator units. The multiplexer interrogates the comparator units and their respective sensing units in response to an address signal.

Therefore, it is an object of the present invention to provide a remote sensing and control system wherein the number of electrical interconnections between the sensing system and the indication system is minimized.

It is also an object of the present invention to provide an indication of the generation of a command signal for actuating a remote device.

It is another object of the present invention to provide a remote sensing and control system wherein the sensing units are connected in parallel and are in communication with a central control and monitoring panel by means of only three lines.

It is a further object of the present invention to provide a remote sensing and control system wherein the status of the sensing units may be constantly monitored.

BRIEF DESCRIPTION OF THE DRAWINGS

The manner in which these and other objects are accomplished by the present invention will become clear from the following detailed description taken in connection with the accompanying drawings wherein.

DETAILED DESCRIPTION OF THE DRAWINGS

Figure 1:
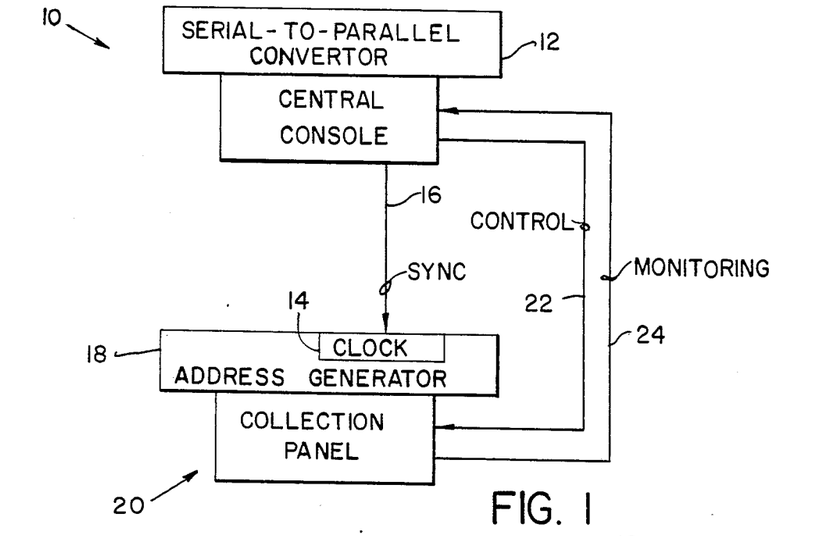
FIG. 1 is a block diagram showing the general operation of the present invention.

FIG. 1 is a block diagram showing the main functional units of the present invention. In order for the present invention to permit communication between a plurality of remote sensing devices and a central control console, the present invention teaches the use of serial-to-parallel converters producing address signals, which have a progressively doubled wave length or, looked at another way, a progressively halved frequency. In the diagram of FIG. 1, the basic clock signal is generated in the central control console, shown generally at 10. The central control console 10 also includes a serial-to-parallel converter 12. The portion of the invention corresponding to the central control console 10 produces a sync signal on line 16, which is fed to a corresponding address generator 18. There is an address generator located at each group of remote sensing units, represented generally by a remote collection panel 20. Included in the remote collection panel 20 is a clock 14. The functions of the clock 14 and sync signal 16 will be explained in more detail hereinbelow. Additionally, when one or more remote actuating devices are employed, control signals for controlling the operation of such devices are sent from the central console on line 22. The data from the remote sensing units appears on line 24 which is termed a monitoring line. The arrowheads on the various interconnecting lines in FIG. 1 indicate the origin and termination of the three main signals of the present invention.

Figure 2:
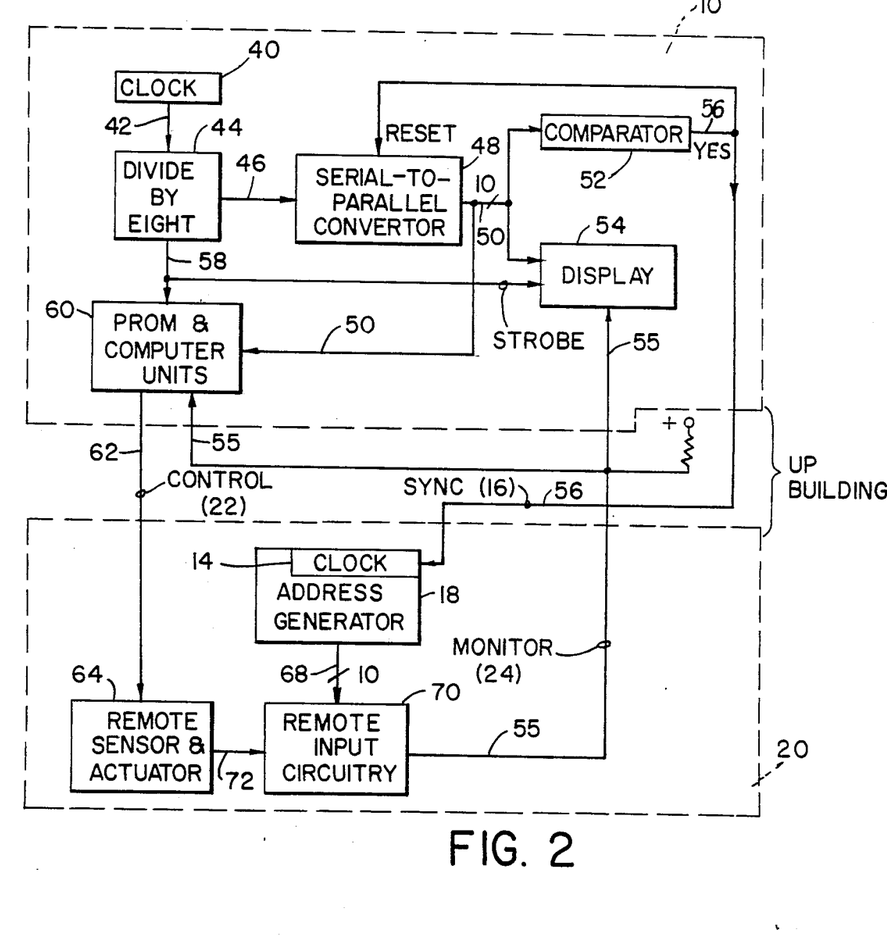
FIG. 2 is a block diagram showing the present invention in more detail.

FIG. 2 shows the block diagram of FIG. 1 in more detail. Specifically, all addresses and timing are derived from a clock unit 40, which in this embodiment, has a frequency of 7.2 KHz. This clock 40 may comprise a quartz crystal controlled oscillator. The output signal from the clock 40 is fed on line 42 to a divide-by-eight counter 44. The divide-by-eight counter 44 produces a signal on line 46 which is 900 Hertz. This signal from the divide-by-eight counter 44 is fed on line 46 to a serial-to-parallel converter 48, which produces ten parallel output signals on multiline 50. For example, the converter 48 may comprise a counter wherein the output signals are obtained from the successive stages of the counter. These outputs correspond to ten address lines, denoted as A through J. By means of these ten lines, up to 1024 different addresses are possible in a binary system. Explanation of the operation of serial-to-parallel converters, such as the converter 48, is explained in the aforementioned U.S. Pat. No. 4,342,985. These lines 50 are connected both to a comparator 52 and to a display 54. The specific waveforms of the ten lines 50, A through J, will be shown hereinbelow.

The comparator 52 may comprise a ten input AND gate and serves to determine when all of the different address signals have been produced by the serial-to-parallel converter 48. At the last address, all of the lines A-J have the same logic state, and the comparator 52 produces an output signal on line 56 which resets the converter 48. Upon receiving the reset signal on line 56, the converter 48 begins to reissue anew the set of ten identifying signals on multiline 50.

As pointed out above, each remote unit is assigned a particular address, represented by the instantaneous values of the ten different address signals in ten preselected time slots, and it also has a corresponding indicator lamp (not shown) in the display 54. When each remote unit is addressed in its turn, the display unit 54 will indicate a normal, trouble or alarm condition, depending upon the state of the signal on line 55.

The signal on line 56, which acts as the reset signal, is also employed as the sync signal on line 16 of FIG. 1. Thus, line 56 is one of the three lines which are fed up the building to the groups of remotely located sensing units.

A strobe signal having a frequency of 1.8 KHz is obtained from the divide-by-eight counter 44 prior to the point internal to the counter where the 900 Hz output signal is produced. This strobe signal on line 58 is fed to the display 54 to synchronize the display and also to PROM, computer and multiplexer units, shown generally at 60. The specific interconnections will be shown in more detail hereinbelow. Also, as may be seen, the output of the converter 48 on line 50, which comprises address lines A-J, is also fed to the computer and PROM units 60. These units 60 produce the control signals on line 62, which was line 22 in FIG. 1. As will be explained hereinbelow, the control signal on line 62 may be used to pull up a remotely located actuating device and is thus directly connected to the remote unit, located generally in the vicinity of the remote collection panel 20. On the other hand, the sync signal on line 56 is fed to the address generator 18 which takes the serial signals of the clock 14 and converts them to ten address lines 68, corresponding to the A-J signals. These ten lines 68 are fed to specialized remote input circuitry, shown generally at 70. The input signals from each of various remote sensor units 64, located generally in the same area, are also fed through this generalized remote input circuitry 70. The remote input circuitry 70 ultimately produces a monitoring signal on line 55 which is fed back to the display 54 and the PROM and computer unit 60. This monitoring signal on line 55 is essentially a data line which is fed back to the display 54 and the PROM and computer unit 60 and serves to gate on the specific display device that corresponds to the remote sensor unit which has sensed either a trouble or alarm condition.

Figure 3A:
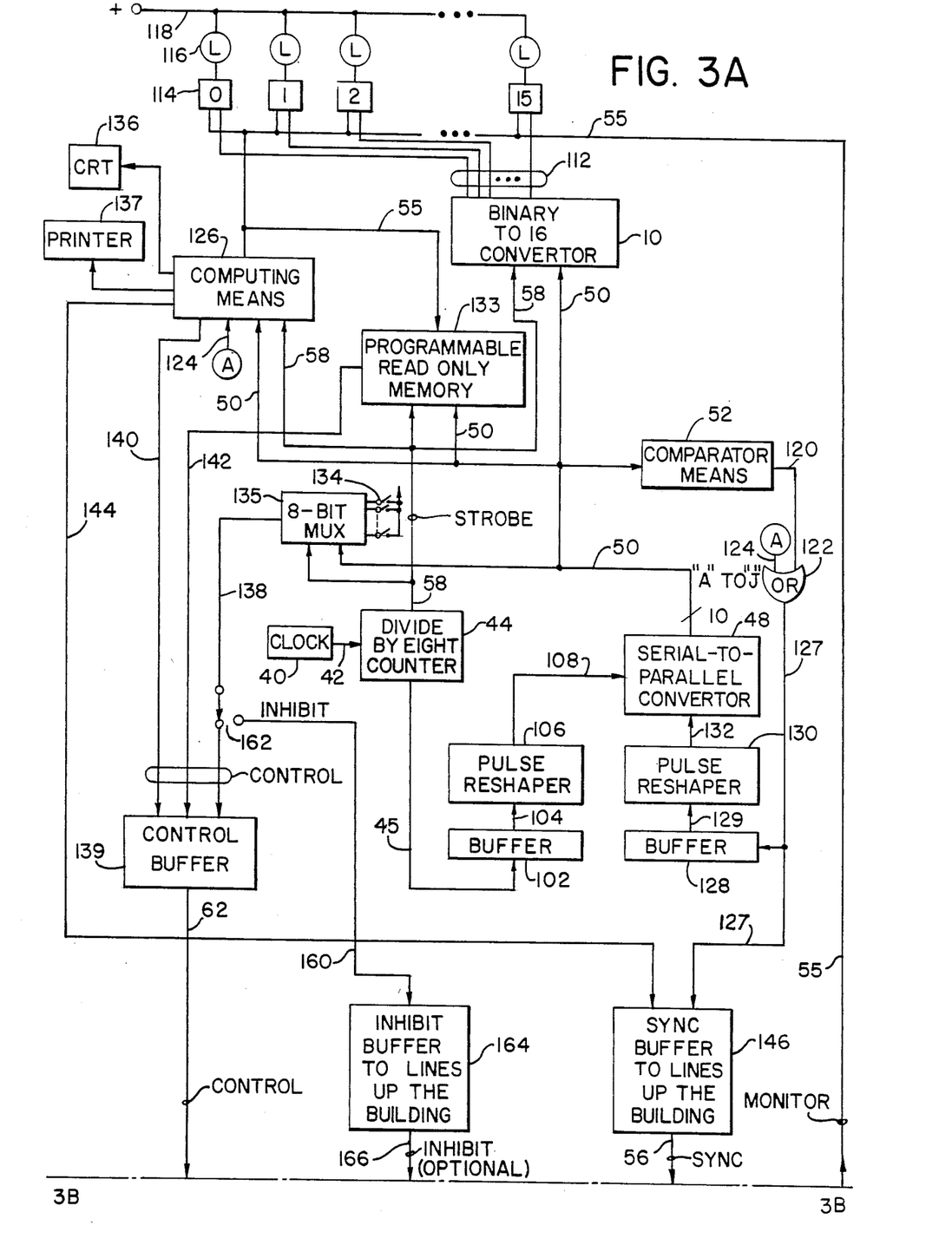
FIGS. 3A and 3B, taken together, comprise a schematic circuit diagram of the present invention.
Figure 3B:
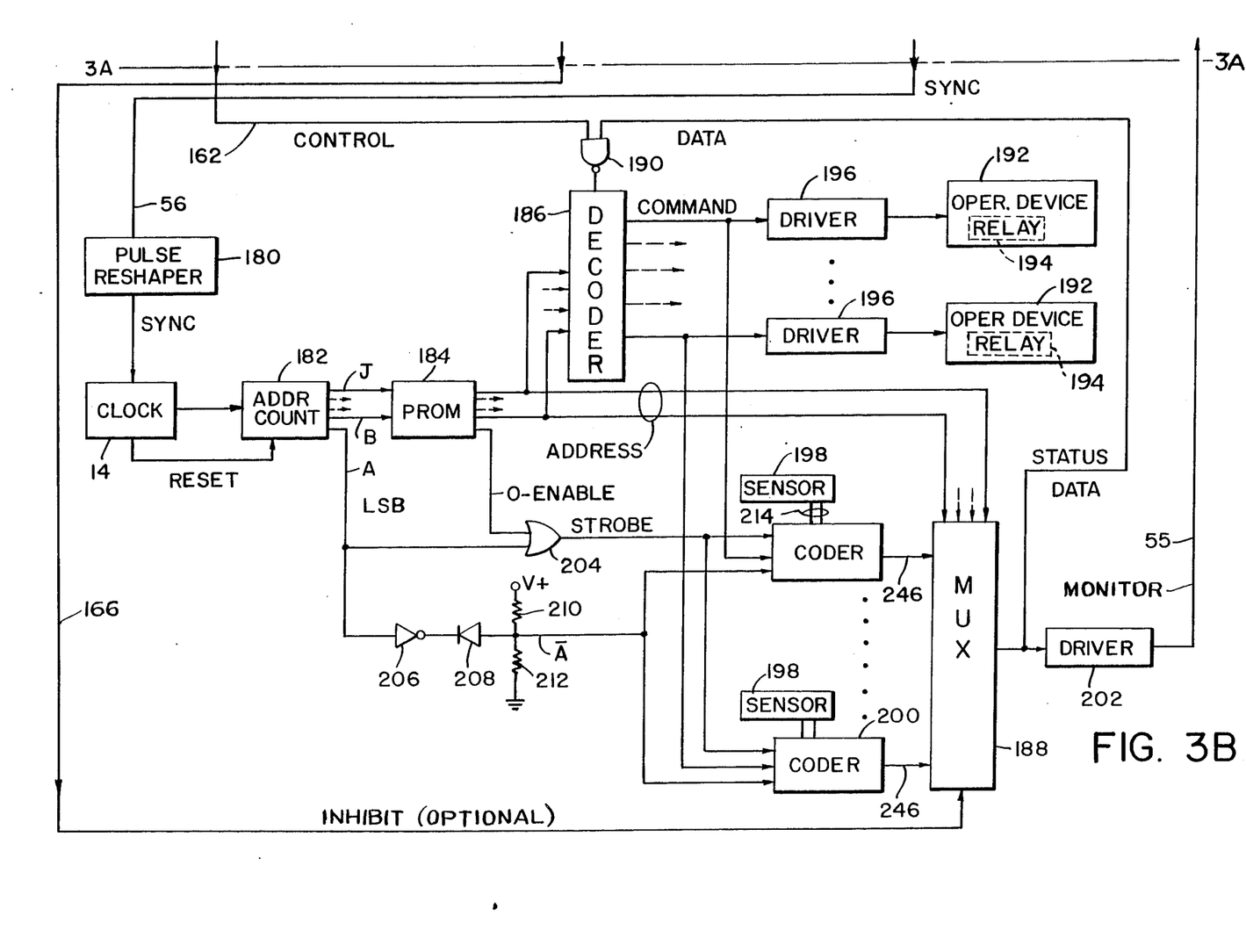

Referring now to FIGS. 3A and 3B, the inventive circuit, as shown in the generalized block diagrams of FIGS. 1 and 2, is expanded even further. Once again, the clock unit 40 produces a 7.2 KHz signal on line 42, which is fed to the divide-by-eight counter 44. The principal output of the counter 44 appears on line 45 and is a 900 Hz signal. This signal is fed to a buffer unit 102 which adjusts the level of the counter 44 signal. The output of the buffer 102 on line 104 is fed to a pulse reshaper 106, which compensates for any clipping or rounding of the signal waveform that may have occurred. Therefore, a buffered and reshaped signal on line 108 is fed to the serial-to-parallel converter 48. It is the output of the serial-to-parallel converter 48 that comprises the ten lines, A-J, which were fed to the display unit 54 of FIG. 2.

The serial-to-parallel converter 48 operates such that when the output signal from one stage has experienced two downwardly going leading edges, the output signal of the succeeding stage will change states. Thus, each succeeding stage will produce one pulse or change of state for each two pulses or changes of state in the preceding stage. This operation takes place in each successive stage of the converter, which has the apparent effect of producing a plurality of parallel signals having progressively halved frequencies. The frequencies of the successive lines are relative to the preceding line.

The display 54 comprises a binary-to-sixteen converter 110, which converts the ten binary signals on multiline 50 to sixteen individual signals appearing on the lines shown collectively as 112. Each of these sixteen lines 112 is fed to a corresponding flip-flop, one of which is shown typically at 114. Each flip-flop 114 also receives the data signal appearing on line 55, which is the monitoring line from the remote sensing units. The output from each flip-flop 114 is connected to a corresponding illumination means or lamp 116, which is also connected to a source of voltage, as represented by power line 118. Thus, upon the coincidence of a trouble or alarm signal on the monitor line 55 and the appropriate address from the binary-to-sixteen converter 110, the corresponding flip-flop 114 will cause the corresponding lamp 116 to be illuminated at the display panel of the control console. Alternatively, the binary-to-sixteen converter 110 and flip-flops 114 of the display 54 may be replaced with two 8-bit serial-to-parallel shift registers (not shown), one register being an alarm register whose outputs directly illuminate respective ones of eight lamps (preferably red in color), the other being a trouble register whose respective outputs directly illuminate eight other lamps (preferably green in color).

The operation of the alternative circuit would be such that alarm data received on the monitoring line 55 is first presented to the data pin of the alarm register while clocking pulses on the line 58 are presented to the enabling pin by way of a window opened by address signals on the multiline 50. Trouble data is thereafter presented to the trouble register with enabling clocking pulses under control of the address signals. The output functions are turned on and remain latched until new data is written into the shift registers.

Figure 6:
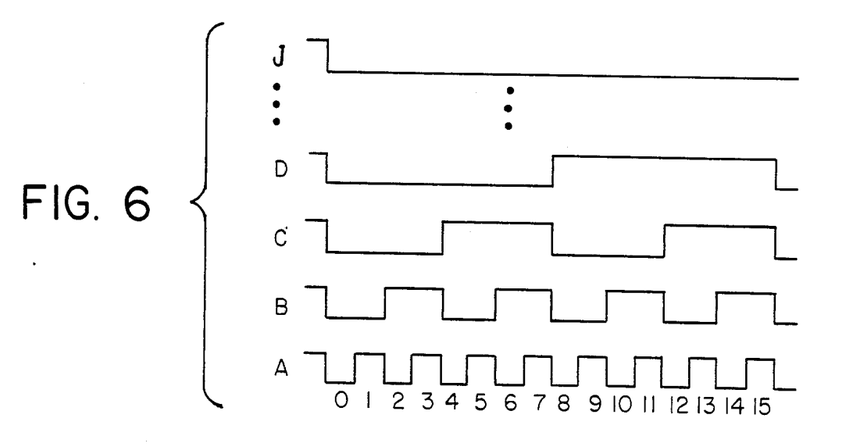
FIG. 6 is a graph of the waveforms showing the clock generated time intervals in the present invention.

Reverting to FIG. 3A, the address signals on multiline 50 from the serial-to-parallel converter 48 are also fed to the comparator 52 which, as previously noted, is a logical AND device for determining when all of the ten address lines are high, a condition which will occur when the last of the output signals from the converter 48 has been doubled in wave length or halved in frequency. This function of the comparator 52 may be more fully appreciated when the waveforms shown in FIG. 6 are examined in detail hereinbelow. When all of the signals have been detected, i.e., when the converter 48 has run through the entire list of the ten different signals, A-J, the comparator 52 produces an output signal or a high level on line 120 which is connected to a logical OR gate 122. This OR gate 122 has as its second input a signal on line 124 (shown at terminal A in the drawing) from a computing means 126. When the comparator 52 detects all of the ten possible output signals A-J, from the converter 48, and line 120 goes high, the output on line 127 of the OR gate 122 also goes high and acts as a reset signal, which is fed back to the converter 48. First, however, the signal on line 127 is fed to a buffer unit 128 where it is adjusted in voltage level and fed out on line 129 to a pulse reshaper 130. The pulse reshaper 130 output signal on line 132 is a shaped pulse signal, which in turn resets the converter 48 to cause it to begin once again converting the clock signals on line 108 into the A-J series of signals.

The divide-by-eight counter 44 also produces the strobe signal on line 58 at a frequency somewhat higher than (preferably double) the 900 Hz on line 45. This strobe signal is fed to the binary-to-sixteen converter 110, a programmable read only memory (PROM) 133, the computing means 126, and an eight-bit multiplexer 135. This strobe signal serves to synchronize the operations of all of these several units with the several address signals used in the present invention. In regard to the computer means 126, it has been found that an 8-bit microcomputer, as manufactured by Firecom, Inc., Model 742, can be advantageously used in the present embodiment of the invention.

The use of a computer base in this embodiment permits the addition of displays, printers and other peripherals without expensive modifications. Connected in the standard manner, i.e., to the appropriate input/output ports of the computing means 126, are a cathode ray tube display 136 and a conventional hard copy printer 137. The address lines 50 are fed to the multiplexer 135 which includes a plurality of command switches 134 which connect with the positive voltage, and may be manually set to select any one of the remotely located actuating units. Upon the 8-bit multiplexer 135 seeing the address of the remote unit selected by the switches, a control signal is produced on line 138, which is fed to a control buffer unit 139. The output of this control buffer unit 139 is the control line 62 which is fed up the building.

Similarly, the computing means 126 is connected to receive the addresses on line 50 and the monitoring data on line 55. The computing means 126 can be programmed in advance to produce a control signal on line 140, upon the coincidence of an alarm signal on line 55 and the preselected remote unit address on multiline 50. This control signal on line 140 is fed to the control buffer 139 prior to sending the control signal up the building.

The programmable read only memory 133 also receives the ten addresses on multiline 50 and the remote unit data on monitor line 55 and, provided that the PROM 133 contains the correct microcode, the appropriate control signal will be produced on line 142. The control signal on line 142 is also fed to the control buffer 139 prior to sending it up the building. The purpose of these control signals will be explained in more detail hereinbelow.

The computing means 126 also produces a synchronization signal on line 144 which is fed to a sync buffer 146, where the signal is level adjusted prior to its being fed up the building on the sync line 56. The comparator 52, which receives the ten address signals on multiline 50, is the principal element which is charged with the production of the sync signal for synchronizing the clock and the serial-to-parallel converter unit located at each of the remote sensing locations.

In the event that the building has been wired with four lines, the fourth line may be used for an additional function such as an inhibit control signal provided on line 160. The inhibit signal is to be sent up the building for turning off the transmissions from a specific sensing unit. This is useful, for example, in the case wherein a monitored device such as a fire door is being repaired or otherwise is temporarily out of service. The inhibit signal is of the same form as the control signal on line 138. By use of a switch 162, the signal on line 138 is detoured onto line 160 to become the inhibit signal. The inhibit signal is applied to a buffer 164 which raises the signal power and is then transmitted via line 166 up the building to the locations of the sensing units. It is noted that the inhibit feature is an optional feature, and is not required for operation of the invention.

Referring now to FIG. 3B, which is a continuation of the circuit of FIG. 3A, and following the same numbering system employed in FIGS. 2 and 3A, the control signal emanating from the control buffer 139 appears on line 62, the inhibit signal emanating from the buffer 164 appears on line 166, the sync signal emanating from the sync buffer 146 appears on line 56, and the monitoring information being fed back to the display unit is on line 55. The sync signal 56 is fed to a pulse reshaper 180 where the serial waveform is restored.

The circuitry of FIG. 3B further comprises the clock 14 and an address counter 182 which, together, comprise the address generator 18 of FIG. 2. In response to clock pulses from the clock 14, the counter 182 sequentially addresses the storage locations of a PROM 184 which, in turn, addresses a decoder 186 and a multiplexer 188. The circuitry of FIG. 3B further comprises an NAND gate 190, and a set of operative devices 192 such as door-closing motors, fans and paging systems which are electrically actuated by relays 194 in response to signals received from drivers 196. The drivers are actuated by command signals from the decoder 186 and incorporate well known circuitry for driving the relays 194. Also included in the circuitry are sensors 198 and coders 200 coupled to input terminals of the multiplexer 188, and a driver 202 coupled to the output terminal of the multiplexer 188. The least significant bit (LSB) of the counter 182 is coupled to the coders 200 by a steering circuit comprising an OR gate 204, a digital inverter 206, a diode 208, and a resistive voltage divider comprising resistors 210 and 212.

In operation, the counter 182 counts pulses from the clock 14 to provide an output count which serves as an address for the PROM 184. A set of lines connects with the respective stages of the counter 182, these lines being designated A-J and provide the same signal waveforms as is provided in FIG. 3A on line 50 from the converter 48. Of the lines A-J, only the lines B-J are used for addressing the PROM 184, line A being coupled to the OR gate 204 and the inverter 206. The signal on line A has the highest pulse repetition frequency, and is the least significant bit, the signals on the lines B-J being of progressively smaller pulse repetition frequency. The repetition frequency of the clock pulses of the clock 14 is the same as that of the clock pulse signal on line 108 applied to the converter 48 in FIG. 3A. Accordingly, the pulse repetition frequencies of the signals A-J are the same as those on line 50. The operation of the clock 14 is synchronized with that of the clock 40 and the counter 44 by means of the synchronization signal on line 56, this signal being coupled via the reshaper 180 to the clock 14. In response to the synchronization signal, the clock 14 resets the counter 182 as will be described hereinafter with reference to FIG. 5, such resetting insuring that the address provided by the counter 182 is identical to that provided by the converter 48 on line 50.

The sensors 198 are distributed at various locations on the floors of the foregoing exemplary office building. The circuitry of FIG. 3B would be located, typically, within a box which would service one, two or three floors with the sensors 198 fanning out from the box by electric wires 214. The number of sensors 198 connected to any one box, and the number of floors to be serviced by any one box is a matter of convenience in the wiring of the building. Additional circuits, such as that disclosed in FIG. 3B, would be provided in other boxes in other floors of the building.

Every sensor 198 has a unique address, there being no two sensors 198 throughout the building having the same address. Thus, for example, one box may service twenty sensors having addresses 1-20, a second box would service sensors having addresses 21-55, and a third box would service sensors having addresses 56-80. Thus, the address of each sensor 198 corresponds to its specific location and the zone in the building under surveillance of the specific sensor. For example, a sensor at location 35 might be a smoke detector positioned for the detection of smoke in a lobby adjacent elevator doors.

The PROM 184 in any one of the foregoing boxes is pre-programmed to provide the address locations of those sensors 198 which are serviced by that specific box. In response to the sequence of address counts provided by the counter 182, the PROM 184 sequentially addresses the sensors 198 for transmitting output data from each of the sensors 198 sequentially along the monitoring line 55 for presentation on the lamps 116 of the display 54.

The addressing of the sensors 198 is accomplished with the aid of the multiplexer 188 and the coders 200. Each coder 200 converts the information provided by its sensor 198 into a two-digit binary word for transmission along the line 55. The normal condition of the sensor 198 is represented by the digital word 10, the detection of some form of activity such as the closing of a fire door or the presence of smoke is indicated by an alarm signal 01. The presence of trouble in the sensing circuit, such as a broken power line, is indicated by the digital word 11. The foregoing three words are the only words which are transmitted along the line 55. In the event that a short circuit occurred in the line 55, the system responds as though a 00 is transmitted, at which point, the system shuts down since, clearly, no information can be transmitted along a grounded monitoring line.

Each of the coders 200 is coupled sequentially by the multiplexer 188 and the driver 202 to the monitoring line 55. The multiplexer 188 acts in response to the address from the PROM 184. In view of the synchronization of the counter 182 with the converter 48 of FIGS. 2 and 3A, and the addressing of the PROM 184 by the counter 182, a sensor data appearing on the monitoring line 55 at any instant of time corresponds to the address on line 50 of FIGS. 2 and 3A.

The generation of the digital words on line 55 by the coders 200 utilizes the LSB (the A line) of the address counter 182 in the same manner as the generation of the corresponding digital words disclosed in the aforementioned U.S. Pat. No. 4,342,985. In the steering circuit, the resistors 210 and 212, coupled between a source of positive voltage and ground, apply a logic-1, or high, voltage to the coders 200. Upon the presence of the LSB, the inverter 206 applies the complemented A signal via the diode 208 and the resistors 210 and 212 to the coders 200 for use in the generation of the digital words. The coders 200 are activated by a strobe signal produced by the OR gate 204, one input signal to the gate 204 being an enable signal from the PROM 184 and the other input being the A line from the counter 182. The enable signal from the PROM 184 is normally high, and drops to a logic-0 signal during enable. Thus, the strobe signal of the gate 204 is a relatively short pulse of logic-0 state occurring between pulses of the LSB signal. A coder 200 operates to form the digital word only upon application of the strobe signal.

The circuitry of FIG. 3B also activates the operative devices 192 in synchronism with the transmission of data from the respective sensors 198 and their coders 200. This is accomplished by applying the same address signals from the PROM 184 to the decoder 186 as are applied to the multiplexer 188. In order to further insure synchronization of the operation of the devices 192 with the presence of the corresponding digital words of the sensors 198, the data at the output of the multiplexer 188 is applied with the control signal 162 to the NAND gate 190. The output signal of the NAND gate 190 is produced only upon the coincidence of the data and control signals, this output signal being coupled to one of the command lines corresponding to the address from the PROM 184. As the PROM 184 cycles through the addresses to the decoder 186, the output signal of the gate 190 is applied sequentially to each of the command lines and, via the respective drivers 196, to operate the respective relays 194 in the operative devices 192. The foregoing utilization of the data and control signals corresponds to that taught in the foregoing U.S. Pat. No. 4,342,985 wherein a transistor circuit is utilized for driving the monitoring line 55, this corresponding to the operation of the driver 202, and an AND circuit is utilized for combining the control signal with the data address signal, this corresponding to the use of the NAND gate 190 and the decoder 186. The foregoing patent also discloses the use of relays for actuation of devices, this corresponding to the use of the relays 194 in the devices 192.

In accordance with an important feature of the invention, the command signals of the decoder 186 are also applied to the coders 200, this being in addition to the coupling of the sensors 198 to the coders 200. Thereby, the digital words generated by the coders 200 can also be utilized to transmit data with respect to the presence of the command signals at the respective output terminals of the decoder 186. This is a most useful feature of the invention in that it enables an operator of the sensing and control system of the invention to know that the system has properly functioned in applying the desired command signal to the desired one of the operative devices 192.

Figure 4:
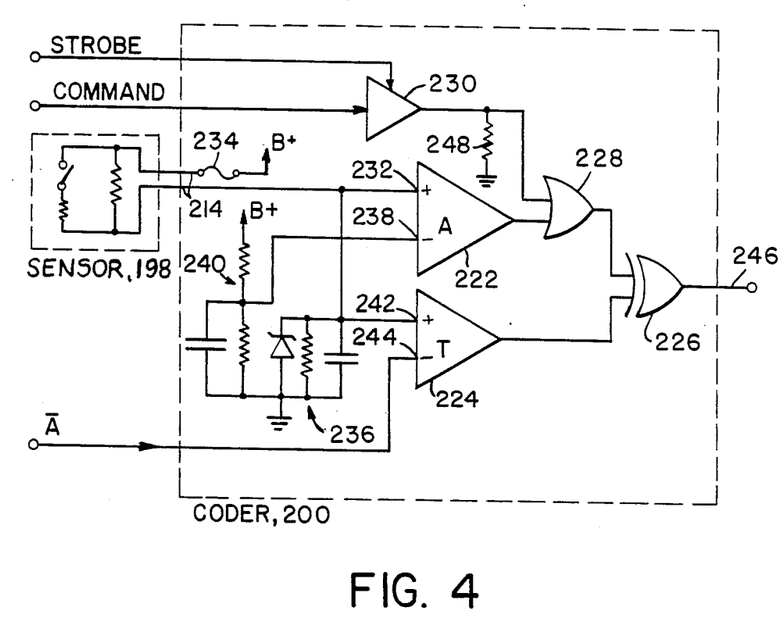
FIG. 4 is a schematic circuit diagram of a data coder of FIG. 3B.

FIG. 4 shows the details of the coder 200 which enables the generation of the digital words to provide information on both the sensor signal and the command signal. The coder 200 comprises a comparator 222, a comparator 224 and an exclusive-OR gate 226. The comparators 222 and 224 are labeled "A" for alarm and the comparator 224 is labeled "T" for trouble which correspond to the A and T comparators of the aforementioned U.S. Pat. No. 4,342,985, and function in cooperation with the gate 226 in the same fashion as described in the foregoing U.S. Pat. No. 4,342,985.

In accordance with the invention, the coder 200 further comprises an OR gate 228 and a gate 230 which is formed as a tri-state device operative in response to the strobe signal of FIG. 3B. The command signal of FIG. 3B is applied to the input terminal of the gate 230, the output terminal thereof being coupled to one input terminal of the gate 228. The second input terminal of the gate 228 is coupled to the output terminal of the comparator 222 while the output terminal of the gate 228 is coupled to one input terminal of the gate 226. The output terminal of the comparator 224 is coupled to the second input terminal of the gate 226.

The positive input terminal 232 of the comparator 222 is connected via one of the lines 214 to the sensor 198, the other line 214 being coupled from the sensor 198 via a fuse 234 to a source of positive voltage. The terminal 232 is further coupled to a voltage clamp circuit 236. In operation, the sensor 198 varies the amount of current flowing through a resistor of the clamp circuit 236, and thereby varies the voltage drop produced by the resistor between the terminal 232 and ground. The capacitor of the clamp circuit 236 serves for noise suppression and the zener diode of the clamp circuit 236 allows the voltage drop across the resistor to rise up to the value of the zener voltage, at which point the voltage remains clamped.

The sensor 198 includes well known circuitry which, by way of example, is represented as two resistors in parallel, one of the resistors being switchably connected in the circuit. In the case of a door closing sensor, the switch has the effect of monitoring the current through the wires 214 so as to raise the voltage at terminal 232 from a relatively low value to a relatively high value as compared to the voltage at terminal 238. In the event that the sensor 198 is a smoke detector having a bridge circuit, the current output of the detector varies in accordance with the operation of the bridge circuit in response to the detection of smoke and, accordingly, the resistors depicted in the sensor 198 are understood to represent such a current variation circuit.

The terminal 238 connects with a voltage divider circuit comprising two resistors coupled between a positive source of voltage and ground, the center point of the voltage divider circuit 240 being connected to ground by a capacitor for suppression of noise. The voltage divider circuit 240 provides a reference value of voltage to the negative input terminal 238 of the comparator 222 against which the variable voltage at the terminal 232 is compared by the comparator 222.

The positive input terminal 242 of the comparator 224 is connected to the terminal 232 of the comparator 222. The negative input terminal 244 of the comparator 224 is connected to the complemented A signal of FIG. 3B. The voltage at terminal 244 of the comparator 244 serves as a reference voltage against which the variable voltage of terminal 242 is compared by the comparator 224.

As is explained in the foregoing U.S. Pat. No. 4,342,985, each bit of the A signal results in the production of a bit of the output digital word at the output terminal of the gate 226 on line 246. The logic state of each bit on line 246 depends on the relative magnitudes of the signal at terminals 232 and 242 relative to the signals at terminal 238 and 244. The normal state results from a relatively low voltage at terminals 232 and 242. The alarm state results from a relatively high voltage at the terminals 232 and 242.

The injection of the command signal via the gate 230 has the same effect as an alarm signal, indicated by a logic-1 state at the output of the comparator 222, applied via the OR gate 228 to the gate 226. Thereby, in the normal state, wherein the output of the comparator 222 is low, a logic-1 signal can be applied by the gate 230 via the gate 228 to the gate 226. A resistor 248 is utilized to maintain the first input terminal of the OR gate 228 at a low voltage in the absence of the command signal being coupled via the gate 230. Since the gate 230 is a tri-state device, no command signal is coupled therethrough in the absence of the strobe signal. Thereby, the coder 200 is able to code sensor signals and the command signal with the digital word appearing on line 246.

Figure 5:
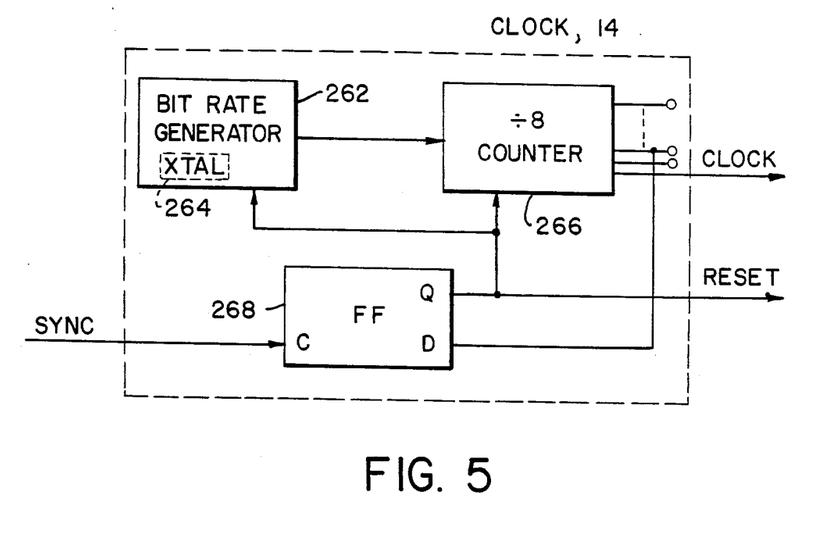
FIG. 5 is a block diagram showing a clock of FIG. 3B in more detail.

FIG. 5 shows a detailed diagram of the clock 14 of FIG. 3B. The clock 14 comprises a bit-rate generator 262, the circuitry thereof including a crystal oscillator 264. The clock 14 further comprises a counter 266 and a type-D flip-flop 268. The bit-rate generator 262, a commercially available circuit, provides a set of output clock pulses in response to pulses in the oscillation of the oscillator 264. The clock pulses from the generator 262 are applied to the counter 266 which has output terminals coupled to respective ones of the counting stages of the counter 266. The pulse repetition frequencies at the output terminals of the counter 266 are related by factors of 2 to the repetition frequency of the pulses of the generator 262. The output terminal of the counter 266 utilized in providing the output clock signal of the clock 14 provides a pulse repetition frequency which is equal to one-eighth the pulse repetition frequency of the generator 262. The output terminal of the counter 266 providing the pulse repetition frequency, equal to four times that of the output clock repetition frequency, is applied to the D input terminal of the flip-flop 268. The synchronization signal from the reshaper 180 of FIG. 3B is applied to the clock input terminal of the flip-flop 268. In response to the presence of a synchronization signal, the flip-flop 268 couples the signal from the terminal D to the output terminal Q of the flip-flop 268 from which it is applied as a reset signal to the generator 262 and to the counter 266. The reset signal is also applied to the address counter 182 of FIG. 3B as has been noted hereinabove. By utilizing the foregoing output signal of the counter 266 for generating the reset signal, the reset process is synchronized with the operation of the counter 266. Thereby, the operation of the circuitry of FIG. 3B is synchronized with the operation of the circuitry of FIG. 3A.

With reference to FIG. 6, the clock generated time intervals or address line signals are shown. As indicated above, the present invention operates so as to halve the frequency of each successive signal which has the effect of doubling the wavelength. These address signals are produced by the clock and the divide-by-eight counter producing a 900 Hz signal that is buffered, shaped and fed to a serial-to-parallel converter. This converter, 48 of FIG. 3A, has a single input line and ten output lines. The first output line corresponds to the A address line and the converter acts to produce a single pulse for every two pulses occurring in the preceding stage. Thus, address line B contains one pulse for every two pulses on the A line and line J contains one pulse for two pulses appearing on line I.

Figure 7:
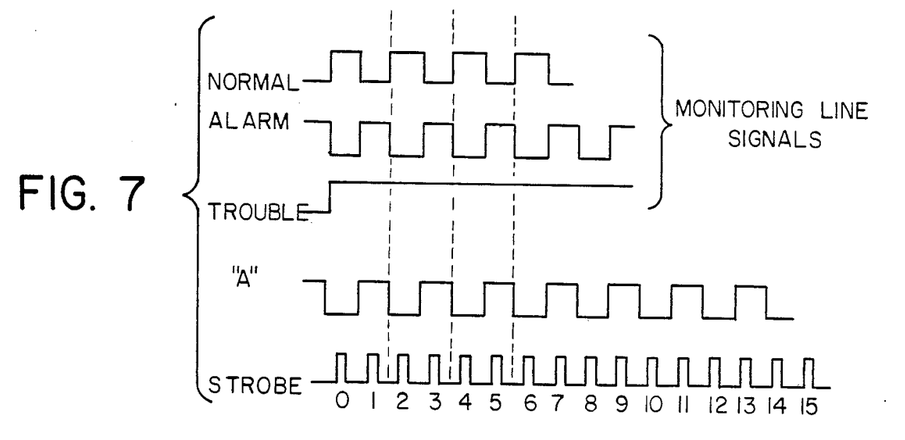
FIG. 7 is a graph of the waveforms indicating the outputs from a remote unit in its various states.

In describing the operation of the present invention, reference is had to FIG. 7. In FIG. 7, the strobe line signals appearing on line 58, as produced by the divide-by-eight counter 44 at a frequency of 1.8 KHz, serve to define the measurement interval. In this graph, the A line signal is arranged above the strobe signal, and the various signals which could possibly appear on the monitoring line 55 produced by the driver 202 are arranged above the A line. Referring then to the monitoring line signals in FIG. 7, when the monitoring line signal goes low, in coincidence with the A line going low and then goes high, this represents an alarm condition at the particular sensing device being addressed. It should be remembered that each particular individual remote sensing unit is compared with the LSB of the address, i.e., the 450 Hz A line. As explained above, when the monitoring line stays high all the time, regardless of the state of the A line, this indicates a trouble condition. Again, if the monitor line tracks or coincides with the A line exactly, this represents an alarm condition.

As indicated above, each remote sensing device is provided with an end of line resistor so as to provide an impedance for the comparators to monitor. Should the actuation device become defective or inoperative, or should it be physically removed from the circuit, the comparators will cause the exclusive OR gate 226 to provide a high output to indicate that a trouble situation is at hand. The data line signal which occurs during an alarm condition tracks the LSB line exactly. This is due to the operation of the comparators and exclusive OR gate explained above. Conversely, the normal line is shifted in phase 180° from the LSB line.

In view of the foregoing description, a sensing and control system has been provided which system is suitable for use in a building of many floors. The invention provides that, in addition to the transmission of status data, the same transmission network may be employed for indicating that command signals have been properly generated for the actuation of devices, such as doors, fans, bells and paging systems. Thereby, the utility of a system of the prior art has been explained while the number of wires required in the transmission of control signals between the floors of the building has been reduced.

In the event that a four-wire installation is present in the building, the fourth wire, shown as line 166 in FIG. 3B, may be coupled to an inhibit terminal of the multiplexer 188. As was explained in FIG. 3A, the inhibit signal is synchronized with the generation of the addresses so that, only the transmission of a coder 200 in the specific time slot of the inhibit signal is blocked from transmission via the driver 202 to the monitoring line 55. Thereby, an additional feature is provided to the inventive system.

It should be understood that the foregoing is presented by way of example only and is not intended to limit the scope of the present invention, except as set forth in the appended claims.

What is claimed is:

1. A remote sensing and control system, comprising:
generator means producing a clock signal;
a serial-to-parallel converter means connected to receive said clock signal and producing a first plurality of parallel address signals;
display means connected to receive said first plurality of parallel address signals;
address means remotely located from said serial-to-parallel converter means and coupled thereto in actuated relationship for producing a second plurality of parallel address signals identical to said first plurality of parallel address signals;
a plurality of sensor means each having a preselected address and having an altered electrical state upon sensing a selected parameter or upon the occurrence of a malfunction of said sensor means;
multiplexing means having inputs connected to each of said plurality of sensor means and being connected to receive said second plurality of parallel address signals, for interrogating a selected one of said plurality of sensor means upon the occurrence of the address of the selected sensor means at said multiplexing means and for producing a monitoring signal indicating the state of said sensor means;
means coupled between said sensor means and said multiplexing means for encoding sensor signals into digital words to be transmitted as said monitoring signal;
remotely located means for generating command signals for activation of remote devices, said encoding means including means for signaling the presence of said command signals;
centrally located means for actuating said command signal generating means; and
means feeding said monitoring signal to said display means for displaying the state of said sensor means during the occurrence of the address of the selected one of said plurality of sensor means.

2. The system of claim 1 further comprising:
logic means connected to receive said first plurality of parallel address signals for producing a synchronization signal upon the production of all of said plurality of parallel address signals, said synchronization signal being fed to said serial-to-parallel converter means and to said address means to reset said converter means and said address means so as to commence producing said plurality of parallel address signals anew, and wherein said command generating means is responsive to said address signals for generating a command signal in a predetermined time slot.

3. The system of claim 1, further comprising:
computing means connected to receive said first plurality of parallel address signals from said serial-to-parallel converter means for producing a control signal upon the simultaneous occurrence of a previously selected address signal and a monitoring signal from the selected one of said plurality of sensor means;
said remote devices including a plurality of actuating means associated with selected ones of said plurality of sensor means and being remotely located from said serial-to-parallel converter means, each of which actuating means performs a selected function; and wherein
said command generating means is connected to receive said second plurality of parallel address signals and said control signal for producing a command signal fed to the corresponding actuating means during the occurrence of the address of the selected associated remote sensor means.

4. The system of claim 1 further comprising:
programmable read only memory means having a predetermined program contained therein and connected to receive said first plurality of address signals from said first serial-to-parallel converter means for producing a control signal upon the simultaneous occurrence of a selected one of said plurality of address signals and a monitoring signal from the sensor means corresponding to the selected address signal;
said remote devices including a plurality of actuating means associated with selected ones of said plurality of sensor means and being remotely located from said serial-to-parallel converter means for performing preselected functions; and wherein
said command generating means is connected to receive said second plurality of address signals and said control signal for producing command signals fed to said actuating means during the occurrence of selected address signals and a monitoring signal, said command generating means including decoder means driven by said address signals for activation of specific lines corresponding to said remote devices.

5. The system of claim 1, further comprising:
second multiplexer means including a plurality of manually actuatable switches for inserting an address of one of said plurality of sensor means and being connected to receive said first plurality of address signals from said serial-to-parallel converter means, for producing a control signal upon the occurrence of the address signal corresponding to the address set in said switches corresponding to the selected one of said plurality of sensor means;
said remote devices including a plurality of actuating means remotely located from said serial-to-parallel converter means for performing selected functions; and wherein
said command generating means is connected to receive said second plurality of address signals and said control signal for producing a command signal fed to one of said actuating means during the occurrence of the address of a preselected remote sensor means; said system further comprising means selectively to said second multiplexing means for inhibiting the transmission of a signal from one of said encoding means.

6. The system of claim 1, wherein said encoding means includes a plurality of pairs of comparator means having the least significant bit of said plurality of address signals connected to an input of each of said comparator means, and each of said plurality of sensor means connected to the remaining inputs of one of said comparator means in each of said pairs, the outputs of said two comparator means in each pair being connected to the inputs of a logical exclusive-OR gate from whose output is derived the monitoring signal, said encoding means further including means for coupling a sample of a command signal to said exclusive-OR gate.

7. The system of claim 3, wherein said encoding means includes a plurality of pairs of comparator means, each pair having the least significant bit of said plurality of address signals connected to an input of both comparator means, the outputs of each pair of said two comparator means being connected to the inputs of said multiplexing means, and other inputs of said multiplexing means being connected to said plurality of second address signals, said address signals each corresponding to a specific sensing means.

8. The system of claim 7, wherein said command generating means comprises decoder means driven by a NAND gate, said control signal of said computing means and an output monitoring signal of said multiplexing means being applied to said AND gate, said decoding means being addressed by said address means concurrently with an addressing of said multiplexing means to couple an output signal of said NAND gate to an output line of said multiplexer to provide a command signal.

9. A remote sensing and control system, comprising:
a signal generator producing a serial clock signal;
a centrally located serial-to-parallel converter means connected to receive said serial clock signal for producing a first plurality of parallel address signals, each signal having a different wavelength;
a centrally located display means connected to receive said first plurality of parallel address signals for providing an information display to an operator of the system;
a plurality of remotely located environmental parameter sensing means, each having associated therewith an individual address represented by the instantaneous values of said first plurality of parallel address signals at preselected times;
at least one remotely located address means synchronized with said serial clock signals for producing a second plurality of parallel address signals identical to said first plurality of parallel address signals;
a remotely located interrogating means connected to said plurality of sensing means and connected to receive said second plurality of parallel address signals for interrogating a selected one of said plurality of sensing means upon the occurrence of the address of the corresponding selected sensing means, for producing a monitoring signal indicating a sensed environmental parameter;
means coupled between said sensing means and said interrogating means for encoding sensor signals of said sensing means into digital words to be transmitted as said monitoring signal;
remotely located means, responsive to actuation of centrally located command switch means, for generating command signals for activation of remote devices, said encoding means including means for signaling the presence of said command signals; and means connecting said monitoring signal to said display means for displaying the information in said monitoring signal during the occurrence of the address of the corresponding selected one of said sensing means.

10. The system of claim 9, further comprising centrally located logic means connected to receive said first plurality of parallel address signals for producing a synchronization signal upon the production of all of said plurality of parallel address signals, means connecting said synchronization signal to said centrally located serial-to-parallel converter means and said at least one remotely located address means to reset both said converter means and said address means so as to begin anew the production of said plurality of parallel address signals, and means driven by said address means for coupling respective ones of said command signals to said encoding means.

11. The system of claim 9, further comprising:

centrally located computing means connected to receive said first plurality of address signals and said monitoring signal, for producing a control signal during the occurrence of the monitoring signal and the portion of said plurality of parallel address signals corresponding to the address of the selected sensing means producing the monitoring signal;

a plurality of remotely located actuating means included within said remote devices and associated with selected ones of said plurality of sensing means for performing a selected function; and wherein said command generating means is connected to receive said second plurality of parallel address signals and said control signal for producing a command signal connected to said actuating means during the occurrence of the address of the selected associated remote sensing means, said command generating means including a decoder driven by said address means for coupling command signals simultaneously to said remote devices and said encoding means.

12. The system of claim 9, further comprising:

centrally located programmable read only memory means containing a program and being connected to receive said first plurality of address signals and said monitoring signal for producing a control signal during the occurrence of the monitoring signal and the portion of said plurality of parallel address signals corresponding to the address of the sensing means producing the monitoring signal;

a plurality of remotely located actuating means included within said remote devices associated with selected ones of said plurality of sensing means for performing a selected work function; and wherein said command generating means is connected to receive said second plurality of parallel address signals and said control signal for producing an actuating signal connected to said actuating means during the occurrence of the address of the selected associated remote sensing means, said command generating means including a decoder, said interrogating means including a multiplexer, and wherein said decoder and said interrogating multiplexer are addressed concurrently by said address counter.

13. The system of claim 9, further comprising:

centrally located multiplexer means including a plurality of manually actuable switches for inserting the address corresponding to selected ones of said plurality of sensor means and being connected to receive said first plurality of address signals and said monitoring signal, for producing a control signal during the occurrence of the monitoring signal and the portion of said parallel address signal corresponding to the address manually inserted by said plurality of switches;

a plurality of remotely located actuating means included within said remote devices and associated with selected ones of said plurality of sensing means for performing selected functions; and wherein said command generating means is connected to receive said second plurality of parallel address signals and said control signal for producing a command signal connected to said actuating means, said command signal being produced during the occurrence of the address of the selected remote sensing means; said system further comprising means selectively coupled to said centrally located multiplexer means for inhibiting said interrogating means from transmitting a signal of a selected one of said sensing means.

14. The system of claim 11, wherein said encoding means includes a pair of comparator means having the least significant bit of a selected one of said plurality of parallel address signals connected to an input terminal of one of said comparator means and the corresponding sensing means connected to the remaining inputs of both of said comparator means for producing an output connected to a logic device from whose output is derived the monitoring signal, an output of the second comparator means of said pair being combined by an OR function with a sample of a command signal.

* * * * *